US008197572B2

(12) United States Patent
Wells

(10) Patent No.: US 8,197,572 B2
(45) Date of Patent: *Jun. 12, 2012

(54) FERTILIZER SUSPENSION AND METHOD OF PREPARATION

(75) Inventor: Geoffrey Dylan Wells, Sebastopol, CA (US)

(73) Assignee: Lawrence Brooke Engineerings, LLC., Rosenburg, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/095,744

(22) Filed: Apr. 27, 2011

(65) Prior Publication Data

US 2011/0226028 A1 Sep. 22, 2011

Related U.S. Application Data

(63) Continuation of application No. 12/401,528, filed on Mar. 10, 2009, now Pat. No. 8,110,017.

(60) Provisional application No. 61/035,688, filed on Mar. 11, 2008.

(51) Int. Cl.
*C05C 1/00* (2006.01)

(52) U.S. Cl. ............... 71/11; 71/58; 71/60; 71/64.08

(58) Field of Classification Search ............... 71/11, 58, 71/60, 64.08
See application file for complete search history.

(56) References Cited

U.S. PATENT DOCUMENTS

| 3,519,413 | A | | 7/1970 | Honore et al. |
|---|---|---|---|---|
| 3,950,159 | A | | 4/1976 | Fox et al. |
| 4,069,034 | A | | 1/1978 | Hoover |
| 4,525,197 | A | | 6/1985 | Eibner et al. |
| 5,707,551 | A | | 1/1998 | Pallas et al. |
| 5,834,533 | A | | 11/1998 | Patel et al. |
| 5,851,260 | A | * | 12/1998 | Aijala et al. ............... 71/28 |
| 5,906,962 | A | | 5/1999 | Pallas et al. |
| 5,925,182 | A | | 7/1999 | Patel et al. |
| 5,969,012 | A | | 10/1999 | Harris, Jr. |
| 5,997,602 | A | * | 12/1999 | Aijala ............... 71/28 |
| 6,743,756 | B2 | | 6/2004 | Harris, Jr. |
| 2002/0065198 | A1 | | 5/2002 | Highsmith et al. |
| 2002/0129632 | A1 | | 9/2002 | Sheppardson et al. |

FOREIGN PATENT DOCUMENTS

| KR | 10-2006-0047264 A | 5/2006 |
|---|---|---|
| KR | 10-2006-0053222 A | 5/2006 |
| WO | WO 2007/047350 A2 | 4/2007 |

OTHER PUBLICATIONS

International Search Report Serial No. PCT/US2009/036792 mailed Jan. 8, 2010.
Notice of Allowance for U.S. Appl. No. 12/401,528 mailed Oct. 3, 2011.
Non-Final Office action for U.S. Appl. No. 12/401,528 mailed Oct. 18, 2010.
Response to Non-Final Office action for U.S. Appl. No. 12/401,528, filed Jan. 14, 2011.
Final Office action for U.S. Appl. No. 12/401,528 mailed Jan. 31, 2011.
Response to Final Office action (RCE) for U.S. Appl. No. 12/401,528, filed Jul. 27, 2011.
Non-Final Office action for U.S. Appl. No. 12/401,528 mailed Aug. 3, 2011.
Response to Non-Final Office action for U.S. Appl. No. 12/401,528, filed Aug. 16, 2011.
Product Literature Labels, "FLORA NOVA Specimen", "One-Part Grow Plant Food 7-4-10", General Hydroponics, Oct. 2002.
Product Literature Labels, "FLORA NOVA Specimen", "One-Part Bloom Plant Food 4-8-7", General Hydroponics, Oct. 2002.
"Specifications, Tolerances, and Other Technical Requirements for Weighing and Measuring Devices,"95th Conference of Weights and Measures 2010, NIST Handbook 44 2011, pp. A-9-A11.
Association of American Plant Food Control Officials, Inc., "AAPFCO Laws & Regulations," Official Publication No. 56, 2003, West Lafayette, Indiana, pp. 1-3, & 36-41.

* cited by examiner

*Primary Examiner* — Wayne Langel
(74) *Attorney, Agent, or Firm* — Michael Blaine Brooks, PC.; Michael B. Brooks; Karol M. Pessin

(57) ABSTRACT

A concentrated, homogenous, stable, water-soluble fertilizer suspension comprising: water-soluble mineral nutrients of at least nitrogen, phosphorous, potassium, calcium, and magnesium; and an organic stabilizing additive; and wherein the pourable, aqueous suspension has water-soluble mineral nutrients amounting to at least about 80 percent by weight (wt. %) of the suspension.

1 Claim, No Drawings

FERTILIZER SUSPENSION AND METHOD OF PREPARATION

CROSS-REFERENCE TO RELATED APPLICATIONS

This application is a continuation of Ser. No. 12/401,528, filed Mar. 10, 2009 now U.S. Pat. No. 8,110,017. This application claims the benefit of U.S. Provisional Patent Application Ser. No. 61/035,688, filed Mar. 11, 2008, both of which are hereby incorporated by reference in their entirety for all purposes.

BACKGROUND

1. Field of Endeavor

The present invention relates to stable, concentrated, aqueous and water-soluble fertilizer suspensions formulated to provide plant nutrition for growing plants, and more particularly to stable, concentrated, aqueous and water-soluble suspensions of mineral salts and nutrient additives.

2. Description of the State of the Art

For healthy and rapid growth, particularly in a hydroponic environment, plants require a nutritionally balanced soluble nutrient feed program. Some liquid mineral fertilizers comprising mineral salts have limited solubility in water. Additionally, some of the elements required for plant growth form insoluble compounds at low concentration levels that precipitate. Liquid fertilizers typically contain the major macronutrients of nitrogen, phosphorous, and potash and the micronutrients: iron, manganese, zinc, copper, boron, molybdenum and frequently omit the intermediate elements of calcium, magnesium, and sulphur. When using liquid fertilizers of this type, one can experience imbalanced growth and nutrient deficiencies in the plant. Liquid fertilizers may be accumulated to provide complete plant nutrition for growing plants. For example, in order to achieve a complete nutrient profile, the feed program may include at least two nutrient containers of ionic nutrients to avoid or minimize precipitation of ions prior to their application to the target hydroponic culture. A well known formulation for solutions in which plants may be grown in hydroponic cultures is Hoagland's solution where a first solution includes potassium nitrate, calcium nitrate, monopatassium phosphate, magnesium sulfate, an iron chelate, and a second solution is a micronutrient stock solution that includes boric acid, manganese chloride, zinc sulfate, copper sulfate and molybdic acid. In addition, Hoagland's solution may achieve a lower pH by the application of ammonium. To apply the Hoagland's solution, this two-solution or two-container approach requires that, in order to provide a complete nutrient feed, one must mix two separate concentrates and dilute each in a user solution to avoid precipitation. From a commercial distribution perspective, one may have to ship sufficient water along with the concentrate in that the water increases handling costs over just the necessary feed.

As an alternative to aqueous suspensions, dry nutrient blends may not contain the full gamut of minerals of a complete solution, and dry nutrient blends may not be completely water-soluble. In hydroponic systems having nutrient monitoring, the effects of the application of a dry nutrient blend to the hydroponic culture may be measurable and affect the subsequent frequency and amounts of the dry nutrient blend that may be added. If the dry nutrient blend is to be dissolved in hydroponic culture comprising cold water, several minutes or several hours may be required to achieve a complete dissolution. This cold water delay injects a non-negligible delay between recognizing the need for an application of a solution feed and actually delivering the solution feed. Likewise in bulk applications of the dissolved dry nutrient blend from a dilution container, several minutes or several hours may be required prior to administering to plants. Furthermore, many dry formulations that contain all the nutrients generally recognized for plant growth are hygroscopic, and absorb moisture from the atmosphere, and may eventually turn an original dry formulation exposed to atmospheric moisture into a sticky paste or one or more solid chunks that may be impractical to measure and dissolve. In addition, a complete dry nutrient blend may be mixed with water to form a liquid suspension and stored in a sealed container which may not exhibit sufficient shelf life. For example, an adverse gaseous chemical reaction may set up over several days that can cause the sealed container to swell, rupture, and leak a brine solution. Thus, a complete dry nutrient blend may be mixed with water to form a liquid suspension, but may be unstable and unsuitable for manufacturing and packaging in sealed storage containers.

Aqueous fertilizer suspensions producing particles that may settle out while on the shelf include the teachings of U.S. Pat. Nos. 3,519,413, and 3,950,159, both of which disclose a suspension of coarse particles and a hydrophilic or a polysaccharide gum for thickening. U.S. Pat. No. 4,069,034 describes a method of making a suspension fertilizer with bentonite and humic acid as crystal growth modifiers. The teachings of this disclosure are directed to a manufacturing process that deals with supersaturating nitrogen and phosphorous in a reactor at elevated temperatures. U.S. Pat. No. 4,525,197 discloses a fertilizer suspension that utilizes magnesium-aluminum silicate as a stabilizer along with a dispersant selected from sorbitol, polyvinyl alcohol, caseinate, and soluble starch hydrolosates to prevent the formation of large crystals. U.S. Pat. No. 5,851,260 discloses a suspension fertilizer suitable for irrigation fertilization and a process for its preparation, and its teachings to not appear directed to a complete fertilizer, having exemplary solutions made from relatively inexpensive, i.e., field grade, fertilizer raw materials with known water insoluble compounds not readily applicable to hydroponic cultivation. U.S. Pat. No. 5,997,602 discloses a method of manufacturing an aqueous fertilizer suspension containing at least phosphate, and calcium and magnesium ions, and its teachings appear to address suspensions that may or may not be nutritionally complete, and producing an inexpensive, i.e., field grade, fertilizer with insoluble material acceptable for a drip irrigation in field use, and where the exemplary form of nitrogen taught is urea. Because water-soluble mineral nutrients are derived from mineral salts, there is an equilibrium point for these salts to form crystals and for the crystals to slowly dissolve back into solution. Because large crystals form at the expense of smaller ones, i.e. Ostwald Ripening, there is a progressive tendency to grow water-soluble crystals in the concentrate. Such water-soluble crystals may eventually grow quite large and sink to the bottom of the suspension. These are particularly troublesome with mineral salts that have a wide range of solubility over different temperatures. This is particularly troublesome with potassium nitrate and urea.

A technique in the formulating arts is to use a cosolvent that is miscible with the solvent that lowers the solubility of the mineral salt and slows the rate of crystal growth. The problem is that few cosolvents are non toxic to plant growth. Another technique to overcome this is to create a non-aqueous suspension as disclosed in U.S. Pat. Nos. 5,707,551, 5,906,962, and 6,743,756 and as described in US Patent Application No. 2002/0065198 A1. U.S. Pat. No. 5,707,551 describes non-aqueous suspension concentrates of highly water-soluble solids where the liquid composition is completely non-aqueous and also requires a complex three-component surfactant system. U.S. Pat. No. 5,834,533 describes stable suspension compositions where the liquid composition is non-aqueous and the application is directed toward well drilling fluids. U.S. Pat. No. 5,906,962 discloses a method of non-aqueous suspension concentrates of highly water-soluble solids. U.S. Pat. No. 5,906,962 is a continuation-in-part of U.S. Pat. No. 5,707,551 based on a non-aqueous solvent and a complex three-component surfactant system, and appears directed toward suspending a slightly water-soluble active compound, e.g., pesticide or herbicide, with a water solubility of less than 1%. U.S. Pat. No. 5,925,182 describes stable liquid suspension compositions, some having limited solubility; a non-aqueous liquid suspension appearing to be directed toward well drilling fluids. U.S. Pat. No. 5,969,012 discloses non-aqueous slurries of water-soluble polymers, where the solvent is non-aqueous and is a vehicle for concentrated water-soluble polymers. U.S. Pat. No. 6,743,756 describes suspensions of particles in non-aqueous solvents, and appears to be directed toward the use of a castor wax as a stabilizer.

SUMMARY

Embodiments of the present invention include suspensions and methods of preparing, i.e., making, the suspension, and working fluids comprising diluted aqueous suspensions. For example, an exemplary concentrated water-soluble plant fertilizer suspension embodiment may comprise water-soluble mineral nutrients of at least nitrogen, phosphorous, potassium, and magnesium, where the total mineral nutrient concentration is at least about 80 and may be up to 95 percent by weight of the suspension, and an organic stabilizing compound or organic stabilizing additive, where the homogenous suspension may be sufficiently stable, i.e., evidencing minimal, if any, adverse gaseous chemical reactions within a hermetically sealed container and over a defined shelf-life period of time, e.g., five day, five weeks, five months, and/or one year. As part of the suspension, the nitrogen may be in the form of a nitrate ion, the phosphorous may be in the form of a phosphorous ion, the potassium may be in the form of a potassium ion, the calcium may be in the form of a calcium ion, and the magnesium may be in the form of a magnesium ion. The amount of the ionic magnesium may be at least 0.5 percent by weight of the suspension. In some embodiments, the total mineral nutrient concentration may be at least about 80 percent by weight of the suspension, and water may comprise less than about 20 percent by weight of the suspension. Other embodiments may contain nitrogen, phosphorous, calcium and magnesium. The exemplary homogenous suspension may also comprise mineral nutrients, such as sulphur and urea. The suspension may further comprise ammonium ions. In some embodiments, the exemplary homogenous suspension may also include mineral nutrients, such as iron, manganese, zinc, boron, copper, and molybdenum. In other embodiments having additional nutrients, the homogenous suspension may be nutritionally complete for plant growth in that the suspension comprises all root-borne nutrients required for plant growth. The suspension may further include additional ingredients of agronomic benefit. The exemplary homogenous suspension may also comprise an organic stabilizer, and may comprise between 0.1 and 20 percent by weight of the suspension. The organic stabilizing additive may be comprised of at least one of the following ingredients: polysaccharides and water-soluble hydrocolloid polysaccharides e.g., a starch and cellulose; disaccharides such as cane sugar, malt, molasses, and beet vinasse; fulvic acid; digested plant material; digested lignin; soluble seaweed; compost tea extracts; vermicompost; and chitosan. The suspension may further comprise crystal growth inhibitors, such as surfactants and humectants.

The exemplary homogenous suspension embodiment comprising water-soluble mineral nutrients of at least nitrogen, phosphorous, ionic magnesium, and potassium, may also comprise a surfactant, e.g., a surfactant that may be selected from a group that includes lecithin, Triton™ X-45 and Triton™ X-100. In some embodiments, the exemplary homogenous suspension may comprise water-soluble mineral nutrients of at least nitrogen, phosphorous, ionic magnesium, and potassium that may also comprise a humectant, e.g., a humectant that may be selected from a group that includes: fructose, sorbitol, xylitol, glycerin, ethylene glycol, diethylene glycol, polyethylene glycol, propylene glycol, and ethylene-propylene block copolymers. In other exemplary embodiments, the homogenous suspension may comprise water-soluble mineral nutrients of at least nitrogen, phosphorous, ionic magnesium, and potassium, and may also comprise a polymer to aid in steric stabilization of the suspension fertilizer, e.g., a steric stabilizer comprising at least one of the following ingredients: gum Arabic; alginic acid; cellulose ethers; lignin sulfonates; condensation products of naphthalenesulfonic acid; polyethylene glycol; polypropylene glycol; polyvinylpyrolidone, polyvinyl alcohol; polystyrene sulfonate; polyacrylic acid; block polymers of ethylene oxide; and block polymers of propylene oxide.

Some embodiments of the concentrated homogenous suspension comprise, by weight of the suspension (wt. %), an amount of nitrogen between about 1 wt. % and about 25 wt. %, an amount of phosphorus between about 1 wt. % and about 25 wt. %, an amount of ionic magnesium of at least about 0.1 wt. %, and an amount of organic stabilizing additive comprising between about 0.1 wt. % and 20 wt. %. The exemplary embodiments may further comprise an amount of potassium between about 1 wt. % and about 25 wt. %, an amount of calcium between about 0.5 wt. % and about 10 wt. %; and an amount of sulphur between 0.1 to 10 wt. %. Accordingly, the exemplary homogenous suspension may be readily dissolvable in water, pH balanced when diluted in water, e.g., about 5.0<pH<about 7.0, evidence minimal, if any, crystal growth, and/or evidence little, if any, inert water insoluble material.

Concentrated, water-soluble, plant fertilizer suspension embodiments of the present invention may comprise a concentrated homogenous suspension that may have one or more water-soluble mineral nutrients, e.g., at least nitrogen, phosphorous, potassium, calcium, ionic magnesium, iron, manganese, zinc, copper, boron and molybdenum, and an organic stabilizer for forming a stable suspension where the homogenous suspension may be sufficiently stable, i.e., evidencing minimal, if any, adverse gaseous chemical reactions within a hermetically sealed container over a defined shelf-life period of time, and where the total mineral nutrient concentration is at least about 80 to 95 percent by weight of the suspension. Some embodiments of the concentrated water-soluble plant fertilizer suspension comprise an amount of water less than about 20 percent by weight of the suspension. Some embodiments of the homogenous suspension are nutritionally complete so that it has all nutrients required for plant growth present in a balanced form.

The organic stabilizer of some embodiments of the concentrated water-soluble plant fertilizer suspension organic stabilizer may be comprised of at least one of the following ingredients: digested plant material, digested lignin, soluble seaweed, cane sugar, malt, beet vinasse, molasses, water-soluble hydrocolloid polysaccharides, compost tea extracts, vermicompost, cellulose and chitosan. The organic stabilizing additive composition of embodiments of the concentrated water-soluble plant fertilizer suspension may comprise between 0.1 and 20 percent by weight of the suspension. The total mineral nutrient concentration of embodiments of the water-soluble plant fertilizer suspension may be at least about 80 percent by weight of the suspension, and the exemplary homogenous suspension may be nutritionally complete, i.e., having all nutrients required for plant growth. Embodiments of the concentrated water-soluble plant fertilizer suspension may comprise a concentrated homogenous suspension having an amount of nitrogen between one and 20 wt. %, and in some embodiments between one and 25 wt. %; an amount of phosphorous between one and 20 wt. %, and in some embodiments between one and 25 wt. %; an amount of potassium between one and 20 wt %, and in some embodiments between one and 25 wt. %; an amount of ionic magnesium from at least about 0.1 wt. %; and the exemplary suspension may further comprise: an amount of calcium between 0.1 and 7.5 wt. %, and in some embodiments between 0.1 wt. % and 10 wt. %; and an amount of sulphur between 0.1 and 5 wt. %. Embodiments of the concentrated water-soluble plant fertilizer suspension may also comprise a humectant, and the humectant may be selected from a group of humectants such as fructose, sorbitol, xylitol, glycerin, ethylene glycol, diethylene glycol, polyethylene glycol, propylene glycol and ethylene-propylene block copolymers. Embodiments of the concentrated water-soluble plant fertilizer suspension may also comprise a polymer that aids in steric stabilization of the suspension fertilizer. Examples of such a polymer that may aids in steric stabilization may be from a group steric stabilizers such as gum Arabic, alginic acid, cellulose ethers, lignin sulfonates, condensation products of naphthalenesulfonic acid, polyethylene glycol, polypropylene glycol, polyvinylpyrolidone, polyvinyl alcohol, polystyrene sulfonate, polyacrylic acid, block polymers of ethylene oxide, and block polymers of propylene oxide.

Embodiments of a concentrated, homogenous, stable, water-soluble fertilizer suspension may comprise: an amount of water comprising less than about 20 percent by weight (wt. %) of the suspension; an amount of calcium nitrate comprising between about 1 wt. % and 40 wt. % of the suspension; an amount of magnesium nitrate comprising between about 1 wt. % and 25 wt. %, and in some embodiments, between about 1 wt. % and 30 wt. %, of the suspension; an amount of potassium phosphate and/or ammonia phosphate comprising between about 1 wt. % and 30 wt. %, and in some embodiments between about 1 wt. % and 35 wt. % of the suspension; an amount of potassium nitrate comprising between about 1 wt. % and 30 wt. %, and in some embodiments between about 1 wt. % and 45 wt. % of the suspension; and an amount of organic stabilizing additive comprising between about 0.1 wt. % and 10 wt. %, and in some embodiments, between about 0.1 wt. % and 20 wt. % of the suspension; and where the concentrated, homogenous, stable, water-soluble fertilizer suspension is a pourable, aqueous suspension.

Embodiments of the present invention include a concentrated water-soluble plant fertilizer suspension that may comprise a concentrated homogenous suspension comprising water-soluble mineral nutrients of at least nitrogen, phosphorous, potassium, calcium, ionic magnesium, sulphur, iron, manganese, zinc, copper, boron and molybdenum, and an organic stabilizing additive, where the homogenous suspension may be sufficiently stable, i.e., evidencing minimal, if any, adverse gaseous chemical reaction within a closed container over a defined shelf-life period of time, and where the total mineral nutrient concentration is at least about 75 percent by weight of the suspension. Exemplary suspension embodiments may comprise less than about 10 percent of water by weight, and may be nutritionally complete, i.e., having all nutrients required for plant growth present in a balanced form.

Embodiments of the present invention also include methods and processes of making a concentrated water-soluble plant fertilizer suspension. For example, a method of making a concentrated water-soluble plant fertilizer suspension comprising the steps of: (blending an amount of water and an amount of calcium nitrate; blending an amount of magnesium nitrate comprising at least 0.5 percent by weight (wt. %) of a final suspension; blending an amount of potassium phosphate and/or an amount of ammonia phosphate blending an amount of potassium nitrate; and blending an amount of an organic stabilizing additive; and where the concentrated, homogenous, stable, water-soluble fertilizer suspension is a pourable, aqueous suspension having an amount of water comprising less than about 20 percent by weight (wt. %) of the final suspension.

In some embodiments, the total mineral nutrient concentration is at least about 80 percent by weight, and in some embodiments, the water content is less than about 20 percent by weight. Examples of one or more organic stabilizers that may be applied in the blending process include at least one of the following ingredients: a starch, fulvic acid, digested plant material, digested lignin, soluble seaweed, cane sugar, malt, beet vinasse, molasses, water-soluble hydrocolloid polysaccharides, compost tea extracts, vermicompost, cellulose, chitosan, and mixtures thereof. The step of blending nitrogen, phosphous, ionic magnesium, and potassium may comprise blending from ranges of ingredients disclosed herein, and an example may comprise blending an amount of nitrogen between one and 25 wt. % of the final suspension; an amount of phosphorus between one and 25 wt. % of the final suspension; and an amount of potassium between one and 25 percent by weight. The step of blending calcium and sulphur may comprise blending an amount of calcium between 0.5 and 10 wt. % of the final suspension and an amount of sulphur between 0.1 and 10 wt. % of the final suspension.

DETAILED DESCRIPTION

A method of formulating and stabilizing a concentrated, complete, nutritionally balanced, readily available water-soluble fertilizer is described. The composition of matter that results from the method embodiment includes all thirteen elements required for plant growth. The exemplary form of the nitrogen may be predominantly that of a nitrate anion for rapid nutrient uptake.

In describing the properties of the concentrate embodiments of the present invention, particular terms are used to address some of these properties. A stable concentrate is one that when stored in a closed container over a period of time, there is no adverse gaseous chemical reaction that causes swelling of the closed container. A homogeneous concentrate is a liquid concentrate that is a stable dispersion that, over a period of time, does not stratify into one or more solid layers and one or more liquid layers having the notable absence of large crystal growth. A complete concentrate is a concentrate having all nutrients required for plant growth present in a balanced form. A water-soluble concentrate is a concentrate having all of its elements readily available for plant uptake and do not need to be digested by microorganisms or undergo any type of weathering or degradation process. A pH balanced concentrate is a concentrate having a ratio of cationic and anionic forms of nitrogen balanced such that the predominant form of nitrogen is in the nitrate form, which is readily available, and not phytotoxic, to the plant. A non-toxic concentrate is a concentrate having no ingredients or additives in its blend that are phytotoxic to plant growth. A concentrate having no inert water insoluble material is a concentrate where all ingredients of the concentrate are readily dissolvable in water and available for plant uptake.

If one adds seaweed, digested plant material, soy protein, Kraft lignins or sulfate lignins, or other similar organic compounds, one can prevent the occurring of off-gassing experienced in the hydrating of dry fertilizers thereby making a stabilized formulation. Formulations having such organic compounds added to the formation have remained stable in the bottle for over 72 months. If seaweed is used in the blend, there are added benefits that may include shelf stability and plant absorption. If soy is used, there are added benefits that may include amino acid nitrogen and chelation effects. Additionally, the organic compounds further aid in the physical stabilization of the suspension, and maintain a homogeneous blend. Accordingly, if the water level is reduced to a practicable minimum and the particles are ground into the micron range, a concentrated stable dispersion is created that has a relatively long shelf life.

Accordingly, exemplary mix embodiments include an organic stabilizer derived from digested plant material or natural seaweed where the organic stabilizer may prevent off-gassing and swelling of the fertilizer container. The ingredients for the suspension are preferably readily soluble and have very low heavy metal contaminants. The water content of the dispersion is preferably controlled carefully in order to maintain a homogeneous blend that has excellent storage capacity and minimal crystal growth. The suspension may also contain additional natural and synthetic polymers to aid in stabilization of the dispersion. In addition, a humectant such as a water-soluble glycol may be added. The suspension exhibits excellent storage capabilities and readily dissolves when dispersed in water. The formula is well suited for hydroponic cultivation of crops as well as plants grown in soil-less or soil-free media. Additionally the preparation is useful for providing a complete balanced plant nutrition program for growing all types of cultivated crops in all types of growing mediums.

The invention, in its several embodiments, allows for a stable pourable homogeneous liquid concentrate well suited for growing plants in that the concentrate is nutritionally complete, water-soluble, pH balanced, non-toxic, and contains no more than trace inert water insoluble material, and the concentrate may be stored in a closed container. The embodiments of the invention may be applied to plants being grown hydroponically and embodiments of the invention may be applied to plants being grown in a soil matrix. The ratio of ammoniacal nitrogen to nitrate nitrogen is kept between 10 and 25%, it does not cause a rapid rise or decline in rhizosphere pH. This helps to maintain a balanced pH in the soil solution so that the solution is kept from wandering below pH 5 and above pH 7. There can be additional ingredients such as phosphates, citrates, carbonates and other organic acids to help buffer and stabilize the solution pH. An additional benefit of highly refined water-soluble mineral salts is that they are relatively free of heavy metal contamination and thus pose little risk to the environment and health of the consumer. The composition may be varied to alter the balance of nitrogen, phosphorous, potassium, and other elements, in order to allow for custom nutrition formulas for vegetative, flowering, and fruit development. The composition may also contain humic and fulvic acids, organic acids, enzymes, simple and complex sugars, vitamins, and growth hormones. Additional formulations are possible, for example, the incorporation of urea as a nitrogen source to lower the cost of production, without straying from the original spirit of the invention.

A concentrated complete nutritionally balanced readily soluble suspension fertilizer containing all thirteen elements required for plant growth comprising water-soluble mineral fertilizer salts and an organic stabilizer to form a stable dispersion may be made according to the following teachings. The mineral salts of the concentrated suspension fertilizer may be selected from a group of mineral salts comprising: ammonium nitrate; ammonium phosphate; ammonium sulphate; calcium nitrate; calcium phosphate; calcium sulphate; magnesium nitrate; magnesium phosphate; magnesium sulphate; potassium nitrate; potassium phosphate; potassium sulphate; iron sulphate; iron phosphate; iron glycinate; iron lignosulphate; chelated iron such as iron chelated via ethylene-diamine-tetra-acetic acid (EDTA), and/or iron chelated via diethylenetriamine pentaacetic acid (DTPA); and urea. The organic stabilizer of the concentrated suspension fertilizer can be selected from: digested plant material, digested lignin, soluble seaweed, beet vinasse, molasses, water-soluble hydrocolloid polysaccharides, compost tea extracts, vermicompost, cellulose, chitosan and mixtures thereof. Additional polymers of natural and synthetic origin to aid in steric stabilization of the mineral particles of the concentrated suspension fertilizer may be selected from the group consisting of gum Arabic, alginic acid, cellulose ethers, lignin sulfonates, condensation products of napthalenesulfonic acid, poly(ethyleneglycol), poly(propyleneglycol), polyvinylpyrrolidone, poly(vinyl alcohol), polystyrene sulfonate, poly(acrylic acid), poly(metacrylic acid) and block polymers of ethylene oxide and propylene oxide. The concentrated suspension fertilizer may include natural surfactants and synthetic surfactants such as lecithin, and TRITON™ X-45 and TRITON™ X-100 which are manufactured by Union Carbide Corporations of Danbury, Conn., USA. The concentrated suspension fertilizer may include a humectant such as glycerin, ethylene glycol, diethylene glycol, polyethylene glycol, propylene glycol, ethylene-propylene block copolymers and mixtures thereof. The total mineral salts concentration of the concentrated suspension fertilizer is preferably between 50 and 95%. The organic stabilizer concentration of the concentrated suspension fertilizer is preferably between 0.1 and 50%. The water-soluble polymer of the concentrated suspension fertilizer is preferably between 0.01 and 5%. The viscosity modifying surfactant of the concentrated suspension fertilizer is preferably present in the amount of 0.001 and 1%. The humectant of the concentrated suspension fertilizer is preferably between 0.1 and 25%.

EXAMPLE 1

The following ingredients in TABLE 1 and all subsequent examples and their respective tables were blended in sequential order with a high-speed disperser and may be blended instead with a rotor stator homogenizer:

TABLE 1

| order | ingredient | %-age by mass |
|---|---|---|
| 1 | CN9 Liquid Calcium Nitrate | 23.59 |
| 2 | Magnesium Nitrate | 20.69 |
| 3 | Calcium Nitrate | 16.28 |
| 4 | MonoAmmonium Phosphate | 6.90 |
| 5 | Potassium Nitrate | 30.34 |
| 6 | Cane Sugar | 2.21 |

After the exemplary composition was mixed into a coarse dispersion, the composition was further milled in a batch attritor until the composition is homogenous and flows. Further milling may be performed in a horizontal media mill or a microfluidizer. The mixing and milling apply generally to all subsequent examples and their respective tables. The percent analysis of the exemplary formulation of TABLE 1 is nitrogen (N)-phosphorus($P_2O_5$)-potassium($K_2O$) percentages of 11.7-4.1-14.0 respectively with 5.7 Calcium(Ca), and 1.9 Manganese(Mg). The amount of water in example 1 is 9.91% by weight of the suspension.

EXAMPLE 2

The ingredients expressed as a percentage of weight/mass of the exemplary suspension, and order of blending, of example 2 are provided in TABLE 2 below:

TABLE 2

| order | ingredient | %-age by mass |
|---|---|---|
| 1 | CN9 Liquid Calcium Nitrate | 23.59 |
| 2 | Magnesium Nitrate | 20.69 |
| 3 | Calcium Nitrate | 16.28 |
| 4 | MonoAmmonium Phosphate | 6.90 |
| 5 | Potassium Nitrate | 30.34 |
| 6 | Dry fulvic | 2.21 |

The percent analysis of the exemplary formulation of TABLE 2 is nitrogen(N)-phosphorus($P_2O_5$)-potassium($K_2O$) percentages of 11.7-4.1-14.0 respectively with 5.7 Calcium(Ca), and 1.9 Manganese(Mg). The amount of water in example 2 is 9.91% by weight of the suspension.

EXAMPLE 3

The ingredients expressed as a percentage of weight/mass of the exemplary suspension, and order of blending, of example 3 are provided in TABLE 3 below:

TABLE 3

| order | ingredient | %-age by mass |
|---|---|---|
| 1 | NH4NO3 liquid | 5.84 |
| 2 | CN9 Liquid Calcium Nitrate | 17.51 |
| 3 | Magnesium Sulfate | 9.34 |
| 4 | Magnesium Nitrate | 7.78 |
| 5 | Calcium Nitrate | 15.56 |
| 6 | MonoAmmonium Phosphate | 10.89 |
| 7 | Potassium Nitrate | 27.24 |
| 8 | Iron DTPA | 1.55 |
| 9 | Manganese EDTA | 0.40 |
| 10 | Zinc EDTA | 0.15 |
| 11 | Potassium Borate | 0.09 |
| 12 | Copper EDTA | 0.12 |
| 13 | Sodium Molybdate | 0.01 |
| 14 | Cobalt Sulfate | 0.01 |
| 15 | Dry fulvic | 3.50 |

The percent analysis of the exemplary formulation of TABLE 3 is nitrogen(N)-phosphorus($P_2O_5$)-potassium($K_2O$) percentages of 10.8-6.5-12.5 respectively with 4.9 Calcium(Ca), 1.6 Manganese(Mg), and 1.2 Sulphur (S). The amount of water in example 3 is 9.81% by weight of the suspension.

EXAMPLE 4

The ingredients expressed as a percentage of weight/mass of the exemplary suspension, and order of blending, of example 4 are provided in TABLE 4 below:

TABLE 4

| order | ingredient | %-age by mass |
|---|---|---|
| 1 | CN9 Liquid Calcium Nitrate | 28.14 |
| 2 | Magnesium Sulfate | 18.39 |
| 3 | Calcium Nitrate | 11.73 |
| 4 | MonoAmmonium Phosphate | 7.88 |
| 5 | MonoPotassium Phosphate | 1.50 |
| 6 | Potassium Nitrate | 26.27 |
| 7 | Iron DTPA | 1.24 |
| 8 | Manganese EDTA | 0.32 |
| 9 | Zinc EDTA | 0.12 |
| 10 | Potassium Borate | 0.07 |
| 11 | Copper EDTA | 0.09 |
| 12 | Sodium Molybdate | 0.01 |
| 13 | Cobalt Sulfate | 0.01 |
| 14 | Dry fulvic | 4.22 |

The percent analysis of the exemplary formulation of TABLE 4 is nitrogen(N)-phosphorus($P_2O_5$)-potassium($K_2O$) percentages of 8.7-5.5-12.6 respectively with 5.3 Calcium(Ca), 1.8 Manganese(Mg), and 2.4 Sulphur (S). The amount of water in example 4 is 11.82% by weight of the suspension.

EXAMPLE 5

The ingredients expressed as a percentage of weight/mass of the exemplary suspension, and order of blending, of example 5 are provided in TABLE 5 below:

TABLE 5

| order | Ingredient | %-age by mass |
|---|---|---|
| 1 | Reverse Osmosis Water | 4.00 |
| 2 | CN9 Liquid Calcium Nitrate | 29.58 |
| 3 | Magnesium Sulfate | 13.99 |
| 4 | Magnesium Nitrate | 4.00 |
| 5 | Calcium Nitrate | 3.68 |
| 6 | MonoAmmonium Phosphate | 7.99 |
| 7 | MonoPotassium Phosphate | 8.79 |
| 8 | Potassium Nitrate | 23.98 |
| 9 | Iron DTPA | 1.06 |
| 10 | Manganese EDTA | 0.28 |
| 11 | Zinc EDTA | 0.11 |
| 12 | Potassium Borate | 0.06 |
| 13 | Copper EDTA | 0.08 |
| 14 | Sodium Molybdate | 0.01 |
| 15 | Cobalt Sulfate | 0.01 |
| 16 | Dry fulvic | 2.40 |

The percent analysis of the exemplary formulation of TABLE 5 is nitrogen(N)-phosphorus($P_2O_5$)-potassium($K_2O$) percentages of 7.7-9.4-14.0 respectively with 4.0 Calcium(Ca), 1.7 Manganese(Mg), and 1.8 Sulphur (S). The amount of water in example 5 is 16.42% by weight of the suspension.

EXAMPLE 6

The ingredients expressed as a percentage of weight/mass of the exemplary suspension, and order of blending, of example 6 are provided in TABLE 6 below:

TABLE 6

| Order | ingredient | %-age by mass |
|---|---|---|
| 1 | Reverse Osmosis Water | 9.38 |
| 2 | CN9 Liquid Calcium Nitrate | 33.20 |
| 3 | Magnesium Sulfate | 11.72 |
| 4 | Magnesium Nitrate | 3.91 |
| 5 | MonoAmmonium Phosphate | 6.25 |
| 6 | MonoPotassium Phosphate | 16.41 |

TABLE 6-continued

| Order | ingredient | %-age by mass |
|---|---|---|
| 7 | Potassium Nitrate | 15.23 |
| 8 | Iron DTPA | 1.04 |
| 9 | Manganese EDTA | 0.27 |
| 10 | Zinc EDTA | 0.10 |
| 11 | Potassium Borate | 0.06 |
| 12 | Copper EDTA | 0.08 |
| 13 | Sodium Molybdate | 0.01 |
| 14 | Cobalt Sulfate | 0.01 |
| 15 | Dry fulvic | 2.34 |

The percent analysis of the exemplary formulation of TABLE 6 is nitrogen(N)-phosphorus($P_2O_5$)-potassium($K_2O$) percentages of 6.1-12.3-12.6 respectively with 3.7 Calcium(Ca), 1.5 Manganese(Mg), and 1.5 Sulphur (S). The amount of water in example 6 is 23.32% by weight of the suspension.

EXAMPLE 7

The ingredients expressed as a percentage of weight/mass of the exemplary suspension, and order of blending, of example 7 are provided in TABLE 7 below:

TABLE 7

| order | ingredient | %-age by mass |
|---|---|---|
| 1 | CN9 Liquid Calcium Nitrate | 46.41 |
| 2 | Magnesium Sulfate | 12.66 |
| 3 | Citric Acid | 4.22 |
| 4 | MonoAmmonium Phosphate | 4.22 |
| 5 | MonoPotassium Phosphate | 23.21 |
| 6 | Potassium Nitrate | 4.22 |
| 7 | Iron DTPA | 1.68 |
| 8 | Manganese EDTA | 0.44 |
| 9 | Zinc EDTA | 0.17 |
| 10 | Potassium Borate | 0.10 |
| 11 | Copper EDTA | 0.13 |
| 12 | Sodium Molybdate | 0.01 |
| 13 | Cobalt Sulfate | 0.01 |
| 14 | Dry fulvic | 2.53 |

The percent analysis of the exemplary formulation of TABLE 7 is nitrogen(N)-phosphorus($P_2O_5$)-potassium($K_2O$) percentages of 5.2-14.6-9.8 respectively with 5.1 Calcium(Ca), 1.2 Manganese(Mg), and 1.6 Sulphur (S). The amount of water in example 7 is 19.49% by weight of the suspension.

EXAMPLE 8

The ingredients expressed as a percentage of weight/mass of the exemplary suspension, and order of blending, of example 8 are provided in TABLE 8 below:

TABLE 8

| order | ingredient | %-age by mass |
|---|---|---|
| 1 | Reverse Osmosis Water | 1.91 |
| 2 | NH4NO3 liquid | 17.18 |
| 3 | CN9 Liquid Calcium Nitrate | 5.73 |
| 4 | Magnesium Sulfate | 9.16 |
| 5 | Magnesium Nitrate | 7.63 |
| 6 | Calcium Nitrate | 15.27 |
| 7 | MonoAmmonium Phosphate | 10.69 |
| 8 | Potassium Nitrate | 26.72 |
| 9 | Iron DTPA | 1.52 |
| 10 | Manganese EDTA | 0.39 |
| 11 | Zinc EDTA | 0.15 |
| 12 | Potassium Borate | 0.09 |
| 13 | Copper EDTA | 0.11 |

TABLE 8-continued

| order | ingredient | %-age by mass |
|---|---|---|
| 14 | Sodium Molybdate | 0.01 |
| 15 | Cobalt Sulfate | 0.01 |
| 16 | Dry fulvic | 3.44 |

The percent analysis of the exemplary formulation of TABLE 8 is nitrogen(N)-phosphorus($P_2O_5$)-potassium($K_2O$) percentages of 11.8-6.4-12.3 respectively with 3.5 Calcium(Ca), 1.6 Manganese(Mg), and 1.2 Sulphur (S). The amount of water in example 8 is 11.53% by weight of the suspension.

EXAMPLE 9

The ingredients expressed as a percentage of weight/mass of the exemplary suspension, and order of blending, of example 9 are provided in TABLE 9 below:

TABLE 9

| order | ingredient | %-age by mass |
|---|---|---|
| 1 | NH4NO3 liquid | 5.42 |
| 2 | CN9 Liquid Calcium Nitrate | 16.25 |
| 3 | Magnesium Sulfate | 8.66 |
| 4 | Magnesium Nitrate | 7.22 |
| 5 | Calcium Nitrate | 14.44 |
| 6 | MonoAmmonium Phosphate | 10.11 |
| 7 | Potassium Nitrate | 25.27 |
| 8 | Urea | 7.22 |
| 9 | Iron DTPA | 1.43 |
| 10 | Manganese EDTA | 0.37 |
| 11 | Zinc EDTA | 0.14 |
| 12 | Potassium Borate | 0.09 |
| 13 | Copper EDTA | 0.11 |
| 14 | Sodium Molybdate | 0.01 |
| 15 | Cobalt Sulfate | 0.01 |
| 16 | Dry fulvic | 3.25 |

The percent analysis of the exemplary formulation of TABLE 9 is nitrogen(N)-phosphorus($P_2O_5$)-potassium($K_2O$) percentages of 13.3-6.1-11.6 respectively with 4.5 Calcium(Ca), 1.5 Manganese(Mg), and 1.1 Sulphur (S). The amount of water in example 9 is 11.53% by weight of the suspension.

EXAMPLE 10

The ingredients expressed as a percentage of weight/mass of the exemplary suspension, and order of blending, of example 10 are provided in TABLE 10 below:

TABLE 10

| order | ingredient | %-age by mass |
|---|---|---|
| 1 | NH4NO3 liquid | 5.53 |
| 2 | CN9 Liquid Calcium Nitrate | 16.60 |
| 3 | Surfactant | 0.04 |
| 4 | Magnesium Sulfate | 8.85 |
| 5 | Magnesium Nitrate | 7.38 |
| 6 | Calcium Nitrate | 14.75 |
| 7 | Citric Acid | 2.77 |
| 8 | Potassium Citrate | 0.92 |
| 9 | MonoAmmonium Phosphate | 10.33 |
| 10 | Potassium Nitrate | 25.82 |
| 11 | Iron DTPA | 1.47 |
| 12 | Manganese EDTA | 0.38 |
| 13 | Zinc EDTA | 0.15 |
| 14 | Potassium Borate | 0.09 |
| 15 | Copper EDTA | 0.11 |
| 16 | Sodium Molybdate | 0.01 |
| 17 | Cobalt Sulfate | 0.01 |

TABLE 10-continued

| order | ingredient | %-age by mass |
|---|---|---|
| 18 | Seaweed | 1.48 |
| 19 | Dry fulvic | 3.32 |

The percent analysis of the exemplary formulation of TABLE 10 is nitrogen(N)-phosphorus($P_2O_5$)-potassium($K_2O$) percentages of 10.2-6.2-12.0 respectively with 4.6 Calcium(Ca), 1.5 Manganese(Mg), and 1.1 Sulphur (S). The amount of water in example 10 is 10.2% by weight of the suspension.

EXAMPLE 11

The ingredients expressed as a percentage of weight/mass of the exemplary suspension, and order of blending, of example 11 are provided in TABLE 11 below:

TABLE 11

| order | ingredient | %-age by mass |
|---|---|---|
| 1 | NH4NO3 liquid | 6.05 |
| 2 | CN9 Liquid Calcium Nitrate | 12.10 |
| 3 | Magnesium Sulfate | 9.68 |
| 4 | Magnesium Nitrate | 8.06 |
| 5 | Calcium Nitrate | 19.76 |
| 6 | MonoAmmonium Phosphate | 11.29 |
| 7 | Potassium Nitrate | 28.23 |
| 8 | Iron DTPA | 1.60 |
| 9 | Manganese EDTA | 0.42 |
| 10 | Zinc EDTA | 0.16 |
| 11 | Potassium Borate | 0.10 |
| 12 | Copper EDTA | 0.12 |
| 13 | Sodium Molybdate | 0.01 |
| 14 | Cobalt Sulfate | 0.01 |
| 15 | Cane sugar | 2.42 |

The percent analysis of the exemplary formulation of TABLE 11 is nitrogen(N)-phosphorus($P_2O_5$)-potassium($K_2O$) percentages of 11.2-6.8-13.0 respectively with 5.1 Calcium(Ca), 1.7 Manganese(Mg), and 1.2 Sulphur (S). The amount of water in example 11 is 7.62% by weight of the suspension.

EXAMPLE 12

The ingredients expressed as a percentage of weight/mass of the exemplary suspension, and order of blending, of example 12 are provided in TABLE 12 below:

TABLE 12

| order | ingredient | %-age by mass |
|---|---|---|
| 1 | NH4NO3 liquid | 4.65 |
| 2 | CN9 Liquid Calcium Nitrate | 13.95 |
| 3 | Magnesium Sulfate | 18.60 |
| 4 | Calcium Nitrate | 17.21 |
| 5 | MonoAmmonium Phosphate | 9.30 |
| 6 | Potassium Nitrate | 31.63 |
| 7 | Iron DTPA | 1.23 |
| 8 | Manganese EDTA | 0.32 |
| 9 | Zinc EDTA | 0.12 |
| 10 | Potassium Borate | 0.07 |
| 11 | Copper EDTA | 0.09 |
| 12 | Sodium Molybdate | 0.01 |
| 13 | Cobalt Sulfate | 0.01 |
| 14 | Cane Sugar | 2.79 |

The percent analysis of the exemplary formulation of TABLE 12 is nitrogen(N)-phosphorus($P_2O_5$)-potassium($K_2O$) percentages of 10.1-5.6-14.5 respectively with 4.8 Calcium(Ca), 1.8 Manganese(Mg), and 2.4 Sulphur (S). The amount of water in example 12 is 7.81% by weight of the suspension.

EXAMPLE 13

The ingredients expressed as a percentage of weight/mass of the exemplary suspension, and order of blending, of example 13 are provided in TABLE 13 below:

TABLE 13

| order | ingredient | %-age by mass |
|---|---|---|
| 1 | CN9 Liquid Calcium Nitrate | 29.29 |
| 2 | Magnesium Sulfate | 14.64 |
| 3 | Magnesium Nitrate | 4.18 |
| 4 | Calcium Nitrate | 4.18 |
| 5 | MonoAmmonium Phosphate | 8.37 |
| 6 | MonoPotassium Phosphate | 9.21 |
| 7 | Potassium Nitrate | 25.10 |
| 8 | Iron DTPA | 1.66 |
| 9 | Manganese EDTA | 0.43 |
| 10 | Zinc EDTA | 0.17 |
| 11 | Potassium Borate | 0.10 |
| 12 | Copper EDTA | 0.12 |
| 13 | Sodium Molybdate | 0.01 |
| 14 | Cobalt Sulfate | 0.01 |
| 15 | Cane Sugar | 2.51 |

The percent analysis of the exemplary formulation of TABLE 13 is nitrogen(N)-phosphorus($P_2O_5$)-potassium($K_2O$) percentages of 8.0-9.8-14.7 respectively with 4.0 Calcium(Ca), 1.8 Manganese(Mg), and 1.9 Sulphur (S). The amount of water in example 13 is 12.30% by weight of the suspension.

EXAMPLE 14

The ingredients expressed as a percentage of weight/mass of the exemplary suspension, and order of blending, of example 14 are provided in TABLE 14 below:

TABLE 14

| order | ingredient | %-age by mass |
|---|---|---|
| 1 | CN9 Liquid Calcium Nitrate | 37.66 |
| 2 | Magnesium Sulfate | 12.55 |
| 3 | Magnesium Nitrate | 4.18 |
| 4 | MonoAmmonium Phosphate | 6.69 |
| 5 | MonoPotassium Phosphate | 17.57 |
| 6 | Potassium Nitrate | 16.32 |
| 7 | Iron DTPA | 1.66 |
| 8 | Manganese EDTA | 0.43 |
| 9 | Zinc EDTA | 0.17 |
| 10 | Potassium Borate | 0.10 |
| 11 | Copper EDTA | 0.12 |
| 12 | Sodium Molybdate | 0.01 |
| 13 | Cobalt Sulfate | 0.01 |
| 14 | Cane Sugar | 2.51 |

The percent analysis of the exemplary formulation of TABLE 14 is nitrogen(N)-phosphorus($P_2O_5$)-potassium($K_2O$) percentages of 6.7-13.2-13.5 respectively with 4.1 Calcium(Ca), 1.6 Manganese(Mg), and 1.6 Sulphur (S). The amount of water in example 14 is 15.82% by weight of the suspension.

EXAMPLE 15

The ingredients expressed as a percentage of weight/mass of the exemplary suspension, and order of blending, of example 15 are provided in TABLE 15 below:

TABLE 15

| order | ingredient | %-age by mass |
|---|---|---|
| 1 | CN9 Liquid Calcium Nitrate | 45.26 |
| 2 | Magnesium Sulfate | 12.93 |
| 3 | Citric Acid | 4.31 |
| 4 | MonoAmmonium Phosphate | 4.31 |
| 5 | MonoPotassium Phosphate | 23.71 |
| 6 | Potassium Nitrate | 4.31 |
| 7 | Iron DTPA | 1.71 |
| 8 | Manganese EDTA | 0.45 |
| 9 | Zinc EDTA | 0.17 |
| 10 | Potassium Borate | 0.10 |
| 11 | Copper EDTA | 0.13 |
| 12 | Sodium Molybdate | 0.01 |
| 13 | Cobalt Sulfate | 0.01 |
| 14 | Cane sugar | 2.59 |

The percent analysis of the exemplary formulation of TABLE 15 is nitrogen(N)-phosphorus($P_2O_5$)-potassium($K_2O$) percentages of 5.1-14.9-10.0 respectively with 5.0 Calcium(Ca), 1.3 Manganese(Mg), and 1.7 Sulphur (S). The amount of water in example 15 is 19.01% by weight of the suspension.

EXAMPLE 16

The ingredients expressed as a percentage of weight/mass of the exemplary suspension, and order of blending, of example 16 are provided in TABLE 16 below:

TABLE 16

| order | ingredient | %-age by mass |
|---|---|---|
| 1 | NH4NO3 liquid | 18.15 |
| 2 | Magnesium Sulfate | 9.68 |
| 3 | Magnesium Nitrate | 8.06 |
| 4 | Calcium Nitrate | 19.76 |
| 5 | MonoAmmonium Phosphate | 11.29 |
| 6 | Potassium Nitrate | 28.23 |
| 7 | Iron DTPA | 1.60 |
| 8 | Manganese EDTA | 0.42 |
| 9 | Zinc EDTA | 0.16 |
| 10 | Potassium Borate | 0.10 |
| 11 | Copper EDTA | 0.12 |
| 12 | Sodium Molybdate | 0.01 |
| 13 | Cobalt Sulfate | 0.01 |
| 14 | Cane Sugar | 2.42 |

The percent analysis of the exemplary formulation of TABLE 16 is nitrogen(N)-phosphorus($P_2O_5$)-potassium($K_2O$) percentages of 12.5-6.8-13.0 respectively with 3.8 Calcium(Ca), 1.7 Manganese(Mg), and 1.2 Sulphur (S). The amount of water in example 16 is 7.62% by weight of the suspension.

EXAMPLE 17

The ingredients expressed as a percentage of weight/mass of the exemplary suspension, and order of blending, of example 17 are provided in TABLE 17 below:

TABLE 17

| order | ingredient | %-age by mass |
|---|---|---|
| 1 | NH4NO3 liquid | 5.79 |
| 2 | CN9 Liquid Calcium Nitrate | 5.79 |
| 3 | Magnesium Sulfate | 9.27 |
| 4 | Magnesium Nitrate | 7.72 |
| 5 | Calcium Nitrate | 20.08 |
| 6 | MonoAmmonium Phosphate | 10.81 |
| 7 | Potassium Nitrate | 27.03 |
| 8 | Urea | 7.72 |

TABLE 17-continued

| order | ingredient | %-age by mass |
|---|---|---|
| 9 | Iron DTPA | 1.53 |
| 10 | Manganese EDTA | 0.40 |
| 11 | Zinc EDTA | 0.15 |
| 12 | Potassium Borate | 0.09 |
| 13 | Copper EDTA | 0.11 |
| 14 | Sodium Molybdate | 0.01 |
| 15 | Cobalt Sulfate | 0.01 |
| 16 | Cane Sugar | 3.47 |

The percent analysis of the exemplary formulation of TABLE 17 is nitrogen(N)-phosphorus($P_2O_5$)-potassium($K_2O$) percentages of 13.9-6.5-12.4 respectively with 4.5 Calcium(Ca), 1.6 Manganese(Mg), and 1.2 Sulphur (S). The amount of water in example 17 is 4.86% by weight of the suspension.

EXAMPLE 18

The ingredients expressed as a percentage of weight/mass of the exemplary suspension, and order of blending, of example 18 are provided in TABLE 18 below:

TABLE 18

| order | ingredient | %-age by mass |
|---|---|---|
| 1 | NH4NO3 liquid | 5.77 |
| 2 | CN9 Liquid Calcium Nitrate | 9.61 |
| 3 | Surfactant | 0.04 |
| 4 | Magnesium Sulfate | 9.23 |
| 5 | Magnesium Nitrate | 7.69 |
| 6 | Calcium Nitrate | 19.99 |
| 7 | Citric Acid | 2.88 |
| 8 | Potassium Citrate | 0.96 |
| 9 | MonoAmmonium Phosphate | 10.77 |
| 10 | Potassium Nitrate | 26.91 |
| 11 | Iron DTPA | 1.53 |
| 12 | Manganese EDTA | 0.40 |
| 13 | Zinc EDTA | 0.15 |
| 14 | Potassium Borate | 0.09 |
| 15 | Copper EDTA | 0.11 |
| 16 | Sodium Molybdate | 0.01 |
| 17 | Cobalt Sulfate | 0.01 |
| 18 | Cane Sugar | 2.31 |
| 19 | Seaweed | 1.54 |

The percent analysis of the exemplary formulation of TABLE 18 is nitrogen(N)-phosphorus($P_2O_5$)-potassium($K_2O$) percentages of 10.7-6.5-12.5 respectively with 4.9 Calcium(Ca), 1.6 Manganese(Mg), and 1.2 Sulphur (S). The amount of water in example 18 is 6.46% by weight of the suspension.

EXAMPLE 19

The ingredients expressed as a percentage of weight/mass of the exemplary suspension, and order of blending, of example 19 are provided in TABLE 19 below:

TABLE 19

| order | ingredient | %-age by mass |
|---|---|---|
| 1 | NH4NO3 liquid | 4.50 |
| 2 | CN9 Liquid Calcium Nitrate | 9.01 |
| 3 | propylene glycol | 3.60 |
| 4 | Magnesium Sulfate | 18.02 |
| 5 | Calcium Nitrate | 19.37 |
| 6 | MonoAmmonium Phosphate | 9.01 |
| 7 | Potassium Nitrate | 30.63 |
| 8 | Iron DTPA | 1.19 |
| 9 | Manganese EDTA | 0.31 |

TABLE 19-continued

| order | ingredient | %-age by mass |
|---|---|---|
| 10 | Zinc EDTA | 0.12 |
| 11 | Potassium Borate | 0.07 |
| 12 | Copper EDTA | 0.09 |
| 13 | Sodium Molybdate | 0.01 |
| 14 | Cobalt Sulfate | 0.01 |
| 15 | Cane Sugar | 4.05 |

The percent analysis of the exemplary formulation of TABLE 19 is nitrogen(N)-phosphorus($P_2O_5$)-potassium($K_2O$) percentages of 9.8-5.4-14.1 respectively with 4.7 Calcium(Ca), 1.8 Manganese(Mg), and 2.3 Sulphur (S). The amount of water in example 19 is 5.68% by weight of the suspension.

EXAMPLE 20

The ingredients expressed as a percentage of weight/mass of the exemplary suspension, and order of blending, of example 20 are provided in TABLE 20 below:

TABLE 20

| order | ingredient | %-age by mass |
|---|---|---|
| 1 | NH4NO3 liquid | 4.46 |
| 2 | CN9 Liquid Calcium Nitrate | 8.93 |
| 3 | Magnesium Sulfate | 17.86 |
| 4 | Calcium Nitrate | 19.20 |
| 5 | Citric Acid | 4.46 |
| 6 | MonoAmmonium Phosphate | 8.93 |
| 7 | Potassium Nitrate | 30.36 |
| 8 | Iron DTPA | 1.18 |
| 9 | Manganese EDTA | 0.31 |
| 10 | Zinc EDTA | 0.12 |
| 11 | Potassium Borate | 0.07 |
| 12 | Copper EDTA | 0.09 |
| 13 | Sodium Molybdate | 0.01 |
| 14 | Cobalt Sulfate | 0.01 |
| 15 | Seaweed | 4.02 |

The percent analysis of the exemplary formulation of TABLE 20 is nitrogen(N)-phosphorus($P_2O_5$)-potassium($K_2O$) percentages of 9.7-5.4-14.0 respectively with 4.6 Calcium(Ca), 1.8 Manganese(Mg), and 2.3 Sulphur (S). The amount of water in example 20 is 7.90% by weight of the suspension.

EXAMPLE 21

The ingredients expressed as a percentage of weight/mass of the exemplary suspension, and order of blending, of example 21 are provided in TABLE 21 below:

TABLE 21

| order | ingredient | %-age by mass |
|---|---|---|
| 1 | CN9 Liquid Calcium Nitrate | 20.24 |
| 2 | Magnesium Sulfate | 14.17 |
| 3 | Magnesium Nitrate | 4.05 |
| 4 | Calcium Nitrate | 10.12 |
| 5 | Citric Acid | 4.05 |
| 6 | MonoAmmonium Phosphate | 8.10 |
| 7 | MonoPotassium Phosphate | 8.91 |
| 8 | Potassium Nitrate | 24.29 |
| 9 | Iron DTPA | 1.61 |
| 10 | Manganese EDTA | 0.42 |
| 11 | Zinc EDTA | 0.16 |
| 12 | Potassium Borate | 0.10 |
| 13 | Copper EDTA | 0.12 |
| 14 | Sodium Molybdate | 0.01 |

TABLE 21-continued

| order | ingredient | %-age by mass |
|---|---|---|
| 15 | Cobalt Sulfate | 0.01 |
| 16 | Seaweed | 3.64 |

The percent analysis of the exemplary formulation of TABLE 21 is nitrogen(N)-phosphorus($P_2O_5$)-potassium($K_2O$) percentages of 7.9-9.5-14.2 respectively with 4.1 Calcium(Ca), 1.8 Manganese(Mg), and 1.8 Sulphur (S). The amount of water in example 21 is 10.57% by weight of the suspension.

EXAMPLE 22

The ingredients expressed as a percentage of weight/mass of the exemplary suspension, and order of blending, of example 22 are provided in TABLE 22 below:

TABLE 22

| order | ingredient | %-age by mass |
|---|---|---|
| 1 | NH4NO3 liquid | 3.05 |
| 2 | CN9 Liquid Calcium Nitrate | 16.03 |
| 3 | Magnesium Sulfate | 20.99 |
| 4 | Calcium Nitrate | 27.86 |
| 5 | MonoPotassium Phosphate | 6.11 |
| 6 | Potassium Nitrate | 22.14 |
| 7 | Iron DTPA | 1.01 |
| 8 | Manganese EDTA | 0.26 |
| 9 | Zinc EDTA | 0.10 |
| 10 | Potassium Borate | 0.06 |
| 11 | Copper EDTA | 0.08 |
| 12 | Sodium Molybdate | 0.01 |
| 13 | Cobalt Sulfate | 0.01 |
| 14 | Cane Sugar | 2.29 |

The percent analysis of the exemplary formulation of TABLE 22 is nitrogen(N)-phosphorus($P_2O_5$)-potassium($K_2O$) percentages of 9.4-3.2-12.3 respectively with 7.1 Calcium(Ca), 2.1 Manganese(Mg), and 2.7 Sulphur (S). The amount of water in example 22 is 8.02% by weight of the suspension.

EXAMPLE 23

The ingredients expressed as a percentage of weight/mass of the exemplary suspension, and order of blending, of example 23 are provided in TABLE 23 below:

TABLE 23

| order | ingredient | %-age by mass |
|---|---|---|
| 1 | CN9 Liquid Calcium Nitrate | 19.63 |
| 2 | Magnesium Sulfate | 19.04 |
| 3 | Calcium Nitrate | 25.52 |
| 4 | MonoPotassium Phosphate | 9.72 |
| 5 | Potassium Nitrate | 21.69 |
| 6 | Iron DTPA | 1.30 |
| 7 | Manganese EDTA | 0.34 |
| 8 | Zinc EDTA | 0.13 |
| 9 | Potassium Borate | 0.08 |
| 10 | Copper EDTA | 0.10 |
| 11 | Sodium Molybdate | 0.01 |
| 12 | Cobalt Sulfate | 0.01 |
| 13 | Cane Sugar | 2.45 |

The percent analysis of the exemplary formulation of TABLE 23 is nitrogen(N)-phosphorus($P_2O_5$)-potassium($K_2O$) percentages of 8.6-5.1-13.3 respectively with 7.0 Calcium(Ca), 1.9 Manganese(Mg), and 2.5 Sulphur (S). The amount of water in example 23 is 8.24% by weight of the suspension.

EXAMPLE 24

The ingredients expressed as a percentage of weight/mass of the exemplary suspension, and order of blending, of example 24 are provided in TABLE 24 below:

TABLE 24

| order | ingredient | %-age by mass |
|---|---|---|
| 1 | NH4NO3 liquid | 3.03 |
| 2 | CN9 Liquid Calcium Nitrate | 19.70 |
| 3 | Magnesium Sulfate | 22.35 |
| 4 | Magnesium Nitrate | 4.55 |
| 5 | Calcium Nitrate | 21.59 |
| 6 | MonoPotassium Phosphate | 6.06 |
| 7 | Potassium Nitrate | 19.70 |
| 8 | Iron DTPA | 0.50 |
| 9 | Manganese EDTA | 0.13 |
| 10 | Zinc EDTA | 0.05 |
| 11 | Potassium Borate | 0.03 |
| 12 | Copper EDTA | 0.04 |
| 13 | Sodium Molybdate | 0.00 |
| 14 | Cobalt Sulfate | 0.00 |
| 15 | Cane Sugar | 2.27 |

The percent analysis of the exemplary formulation of TABLE 24 is nitrogen(N)-phosphorus($P_2O_5$)-potassium($K_2O$) percentages of 8.9-3.2-11.1 respectively with 6.3 Calcium(Ca), 2.6 Manganese(Mg), and 2.9 Sulphur (S). The amount of water in example 24 is 9.55% by weight of the suspension.

To the extent that the present invention has been described in terms of preferred and exemplary embodiments, it will be apparent to those of ordinary skill in the art that variations may be applied to the compositions and/or methods, i.e., in the steps or in the sequence of steps of the method described herein without departing from the concept, spirit, and scope of the invention. More specifically, it will be apparent that certain agents which are both chemically and physiologically related may be substituted for the agents described herein while the same or similar results would be achieved.

What is claimed is:

1. A concentrated, homogenous, stable, water-soluble fertilizer suspension in a sealed container comprising:
    an amount of water comprising about 1.91 percent by weight (wt. %) of the suspension;
    an amount of ammonium nitrate comprising about 17.18 wt. % of the suspension;
    an amount of liquid calcium nitrate comprising about 5.73 wt. % of the suspension;
    an amount of magnesium sulfate comprising about 9.16 wt. % of the suspension;
    an amount of magnesium nitrate comprising about 7.63 wt. % of the suspension;
    an amount of calcium nitrate comprising about 15.27 wt. % of the suspension;
    an amount of monoammonium phosphate comprising about 10.69 wt. % of the suspension;
    an amount of potassium nitrate comprising about 26.72 wt. % of the suspension;
    an amount of iron DTPA comprising about 1.52 wt. % of the suspension;
    an amount of manganese EDTA comprising about 0.39 wt. % of the suspension;
    an amount of zinc EDTA comprising about 0.15 wt. % of the suspension;
    an amount of potassium borate comprising about 0.09 wt. % of the suspension;
    an amount of copper EDTA comprising about 0.11 wt. % of the suspension;
    an amount of sodium molybdate comprising about 0.01 wt. % of the suspension;
    an amount of cobalt sulfate comprising about 0.01 wt. % of the suspension;
    an amount of dry fulvic comprising about 3.44 wt. % of the suspension; and
    wherein the concentrated, homogenous, stable, water-soluble fertilizer suspension is a pourable, aqueous suspension.

* * * * *